United States Patent
Home et al.

(10) Patent No.: US 6,896,379 B2
(45) Date of Patent: *May 24, 2005

(54) TRAILER TOW MIRROR

(75) Inventors: Paul Home, Craigburn Estate (AU); Paul R. Henion, Fort Gratiot, MI (US); Peter Robert Rothe, Coromandel Valley (AU); David Henderson Woollard, Mylor (AU); Barry Whitford, Happy Valley (AU); Trevor Fimeri, Seacliff (AU); Simon Orme, Hallett Cove (AU)

(73) Assignee: Britax Rainsfords Pty. Limited, Lonsdale (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/464,085

(22) Filed: Jun. 18, 2003

(65) Prior Publication Data

US 2003/0223134 A1 Dec. 4, 2003

Related U.S. Application Data

(63) Continuation of application No. 10/191,264, filed on Jul. 8, 2002, now Pat. No. 6,592,231, which is a continuation of application No. 09/900,296, filed on Jul. 6, 2001, now Pat. No. 6,416,192, which is a continuation of application No. 09/399,293, filed on Sep. 17, 1999, now Pat. No. 6,276,805.

(51) Int. Cl.$^7$ .................. G02B 7/182; G02B 7/198; B60R 1/06
(52) U.S. Cl. .................. 359/841; 359/872; 359/881; 248/476; 403/377
(58) Field of Search .................. 359/838, 841, 359/844, 871, 872, 875, 877, 881; 248/466, 476, 477, 478, 479, 480, 495, 496, 512, 513, 514, 548, 549, 900; 403/109.1, 109.2, 109.3, 109.5, 109.8, 376, 377, 378, 379, 383

(56) References Cited

U.S. PATENT DOCUMENTS

| 1,259,847 | A | 3/1918 | Godwin |
| 2,526,306 | A | 10/1950 | van Gelder |
| 3,107,077 | A | 10/1963 | Lassa |
| 3,118,965 | A | 1/1964 | Jones |
| 3,123,041 | A | 3/1964 | Gunderson |
| 3,168,277 | A | 2/1965 | Stewart |

(Continued)

FOREIGN PATENT DOCUMENTS

| DE | 3501 157 C1 | 6/1986 |
| DE | 3938961 A1 | 5/1991 |
| EP | 0 385 814 A1 | 9/1990 |
| FR | 2574726 | 6/1986 |
| FR | 2654997 A | 5/1991 |
| GB | 708349 | 5/1954 |
| GB | 1373052 | 11/1974 |
| GB | 1590740 | 6/1981 |
| GB | 2193940 | 2/1988 |
| GB | 2228240 A | 8/1990 |
| JP | 036537 | 2/1989 |
| JP | 2-6247 | 1/1990 |

OTHER PUBLICATIONS

U.S. application No. 60/141,043.*

Primary Examiner—John Juba, Jr.
(74) Attorney, Agent, or Firm—Jones Day (57) ABSTRACT

A mirror assembly has a pair of telescoping tubular supports extending between a support base and a mirror head to provide adjustment of the mirror head toward and away from the support base. Friction shoes within the tubular supports releasably hold such supports against unintentional telescoping movement. Cooperating stops on the telescoping supports limit outward movement of the mirror head and prevent complete separation of the telescoping supports. The tubular supports are hingedly attached to the support base for rotation about a vertical axis, and cooperating detents and spring elements on the supports and support base releasably hold the supports against rotation.

2 Claims, 13 Drawing Sheets

U.S. PATENT DOCUMENTS

| | | |
|---|---|---|
| 3,346,229 A | 10/1967 | Carson, Jr. |
| 3,583,734 A | 6/1971 | Magi .......................... 287/92 |
| 3,954,328 A | 5/1976 | Ames |
| 4,558,930 A | 12/1985 | Deedreek |
| 4,623,115 A | 11/1986 | Brester ...................... 248/479 |
| 4,778,265 A | 10/1988 | Fingerle et al. |
| 5,039,055 A | 8/1991 | Lempelius .................. 248/480 |
| 5,081,546 A | 1/1992 | Bottrill ....................... 359/841 |
| 5,342,015 A | 8/1994 | Burton et al. ............... 248/478 |
| 5,483,385 A | 1/1996 | Boddy ....................... 359/841 |
| 5,841,594 A | 11/1998 | Rothe ......................... 359/841 |
| 5,903,402 A | 5/1999 | Hoek .......................... 359/841 |
| 6,126,302 A * | 10/2000 | Corn .......................... 362/492 |
| 6,142,699 A | 11/2000 | Pao ........................... 403/109.5 |
| 6,179,513 B1 | 1/2001 | Marasco .................. 403/374.5 |
| 6,276,805 B1 | 8/2001 | Home et al. ................ 359/841 |
| 6,276,808 B1 | 8/2001 | Foote et al. ................. 359/877 |
| 6,325,518 B1 | 12/2001 | Whitehead et al. ......... 359/841 |
| 6,416,192 B2 | 7/2002 | Home et al. ................ 359/841 |

* cited by examiner

TRAILER TOW MIRROR

REFERENCE TO RELATED APPLICATIONS

This application is a continuation of U.S. Ser. No. 10/191,264 filed Jul. 8, 2002 now U.S Pat. No. 6,592,231, which is a continuation of U.S. Ser. No. 09/900,296, filed Jul. 6, 2001, now U.S. Pat. No. 6,416,192 which is a continuation of U.S. Ser. No. 09/399,293 filed Sep. 17, 1999, now U.S. Pat. No. 6,276,805.

BACKGROUND OF THE INVENTION

This application relates to the art of vehicle rear view mirrors and, more particularly, to trailer tow mirrors that can be adjusted to extend varying distances outwardly from the side of a vehicle.

Telescoping trailer tow mirror assemblies desirably are maintained in their adjusted position against unintentional movement. At the same time, it is desirable that adjustment can be performed quickly without the need for the use of tools or complicated mechanisms. In addition, it is desirable that the mirror assembly be rotatable about a vertical axis relative to a support base in response to forward or rearward forces acting on the mirror head. This minimizes damage to the mirror assembly when a fixed object is struck by the mirror head or by the telescoping support arms.

SUMMARY OF THE INVENTION

A telescoping trailer tow mirror assembly has a support base with a pair of vertically-spaced parallel tubular support arms extending horizontally outwardly therefrom. A pair of vertically-spaced parallel mirror mounting arms are telescopically received within the tubular support arms for longitudinal movement relative thereto to vary the distance between the support base and a mirror head carried by the mounting arms.

In accordance with the present application, releasable holding devices are located internally of the tubular support arms for releasably holding the mounting arms against longitudinal movement relative to the support arms. In one arrangement, the releasable holding devices are friction shoes carried by the mounting arms and are biased into engagement with internal surfaces of the tubular support arms.

In a preferred arrangement, each mounting arm carries two longitudinally-spaced friction shoes that engage an inner surface of a tubular support arm in which a mounting arm is received to provide improved stability and vibration performance, along with better adjustment feel.

In accordance with another aspect of the application, the support arms are hingedly connected to the support base for rotation about a vertical axis. Cooperating detents and spring elements adjacent to the hinged connections releasably hold the support arms against unintentional rotation. When a forward or rearward force is applied to the mirror head or support arms, the spring elements are cammed out of both the upper and lower detents to permit rotation of the support arms relative to the support base and minimize or prevent damage to the mirror assembly or vehicle.

The horizontally extending and vertically-spaced parallel telescoping supports of the present application provide excellent stability during telescoping movement. Location of the friction shoes internally of the tubular support arms hides any wear marks that may result from repeated telescoping adjustments.

It is a principal object of the present invention to provide an improved telescoping trailer tow mirror assembly.

It is also an object of the invention to provide a telescoping trailer tow mirror assembly that has very good stability during telescoping adjustment.

It is another object of the invention to provide a telescoping trailer tow mirror assembly with friction shoes that releasably hold the telescoping supports in an adjusted position against unintentional movement.

It is a further object of the invention to provide an adjustable support for a mirror head wherein a mounting arm that is slidably received in a tubular support arm carries a pair of longitudinally-spaced friction shoes that are biased into engagement with the inner surface of the support arm for releasably holding the mounting arm against sliding movement.

It is an additional object of the invention to provide a telescoping trailer tow mirror assembly that requires no tools or special fittings for adjustability and that can be adjusted very quickly.

It is also an object of the invention to provide an improved detent and spring element arrangement for releasably holding support arms against rotation about a vertical axis relative to a support base.

DESCRIPTION OF A PREFERRED EMBODIMENT

Figure 1:
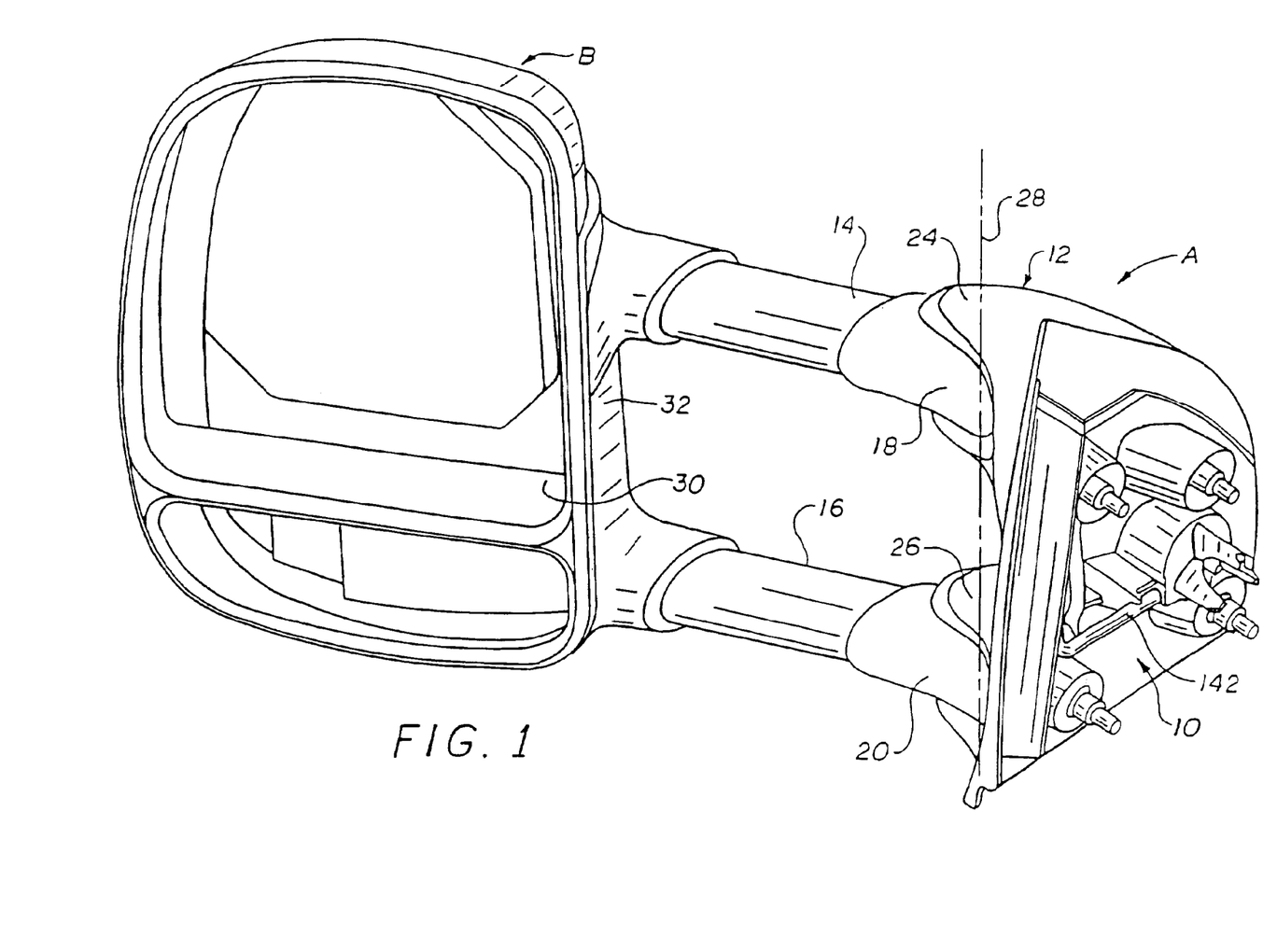
FIG. 1 is a perspective illustration of a telescoping trailer tow mirror assembly constructed in accordance with the present application.

Referring now to the drawing, wherein the showings are for purposes of illustrating a preferred embodiment of the invention only and not for purposes of limiting same, FIG. 1 shows a support A that is adapted to be attached externally of a vehicle body. Support A includes a support base 10 having an escutcheon 12 attached to the outer side thereof.

A pair of horizontally extending parallel tubular support arms 14, 16 are vertically spaced-apart and have end portions 18, 20 hingedly connected to support A by way of an upper clevis 24 and a lower clevis 26 for rotation about a vertical axis 28.

Mirror head assembly B is attached to tubular support arms 14, 16 for selective adjustable movement toward and away from support A, and the mirror head assembly B includes a mirror base 30 and a mirror escutcheon 32. Each tubular support arm 14, 16 has a pair of opposite inwardly extending flexible stop tabs 14a, 14b and 16a, 16b adjacent the outer ends thereof for cooperating with abutments provided by stop projections on mirror head assembly B as hereinafter described.

Figure 2:
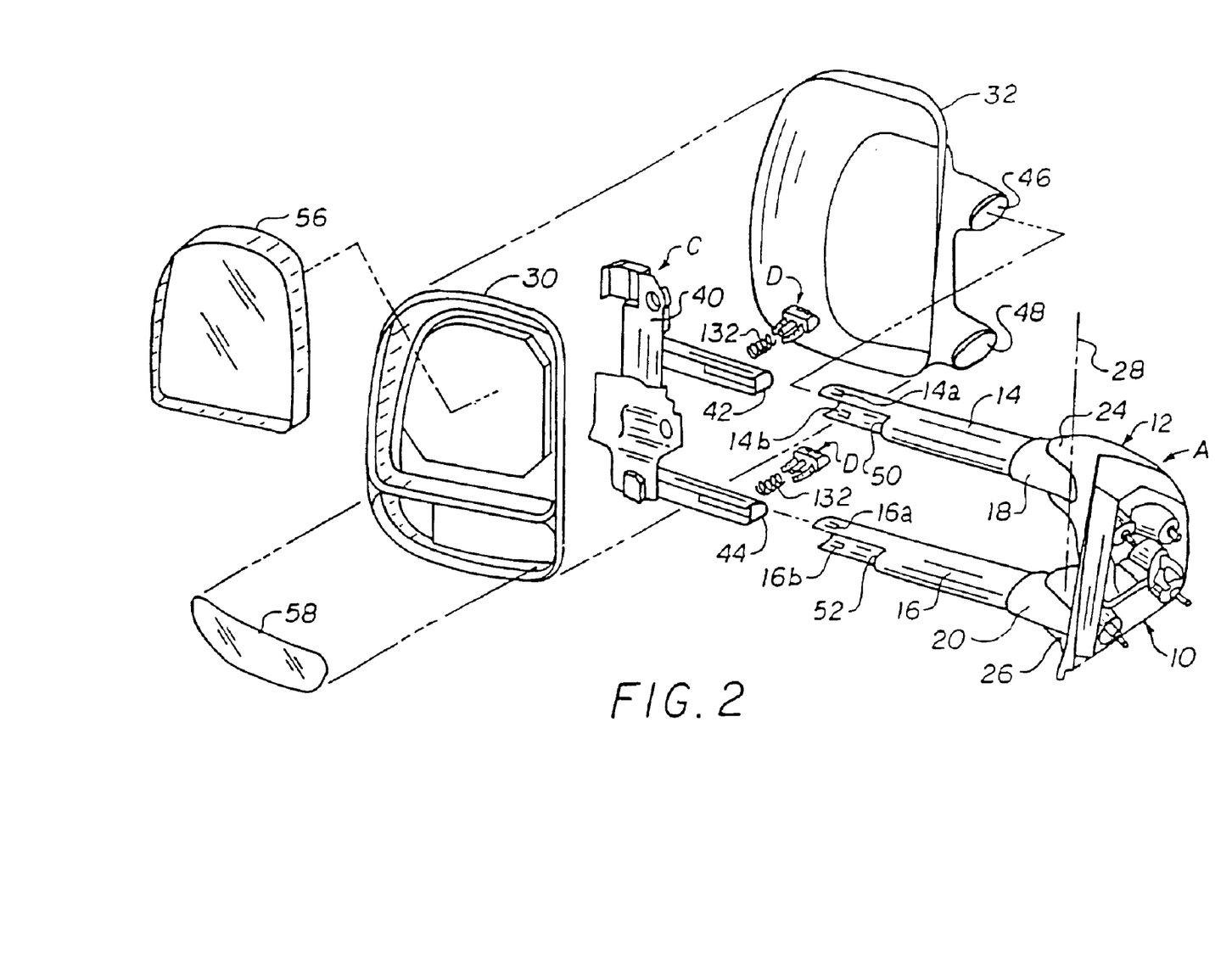
FIG. 2 is an exploded perspective illustration thereof.

FIG. 2 shows a mirror base plate C having a mounting portion 40 that is assembled to and between the rear of mirror base 30 and the interior of mirror escutcheon 32 by suitable fasteners. A pair of vertically-spaced parallel mounting arms 42, 44 extend horizontally from mounting portion 40 through openings 46, 48 in mirror escutcheon 32 for reception in tubular support arms 14, 16. The free end portions of tubular support arms 14, 16 are longitudinally notched or cut-away as indicated at 50, 52 along the sides thereof that face toward mounting portion 40 so that the notched end portions of the support arms can move longitudinally behind mounting portion 40 along mounting arms 42, 44 instead of striking the forward edge thereof. Primary and secondary mirrors 56, 58 are mountable to mirror base 30 in a known manner.

Figure 3:
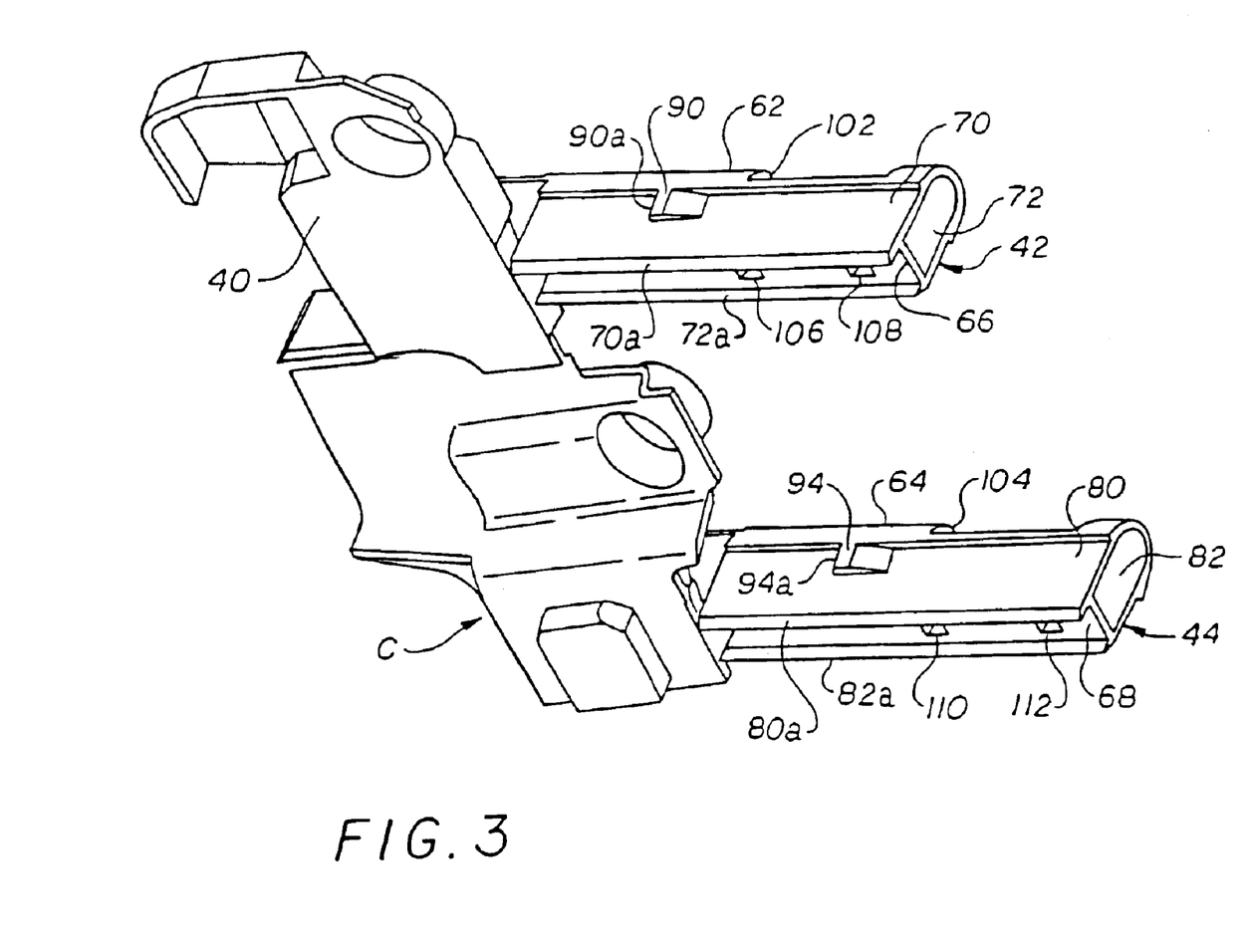
FIG. 3 is a rear perspective illustration of a base plate used with the assembly of FIGS. 1 and 2.
Figure 4:
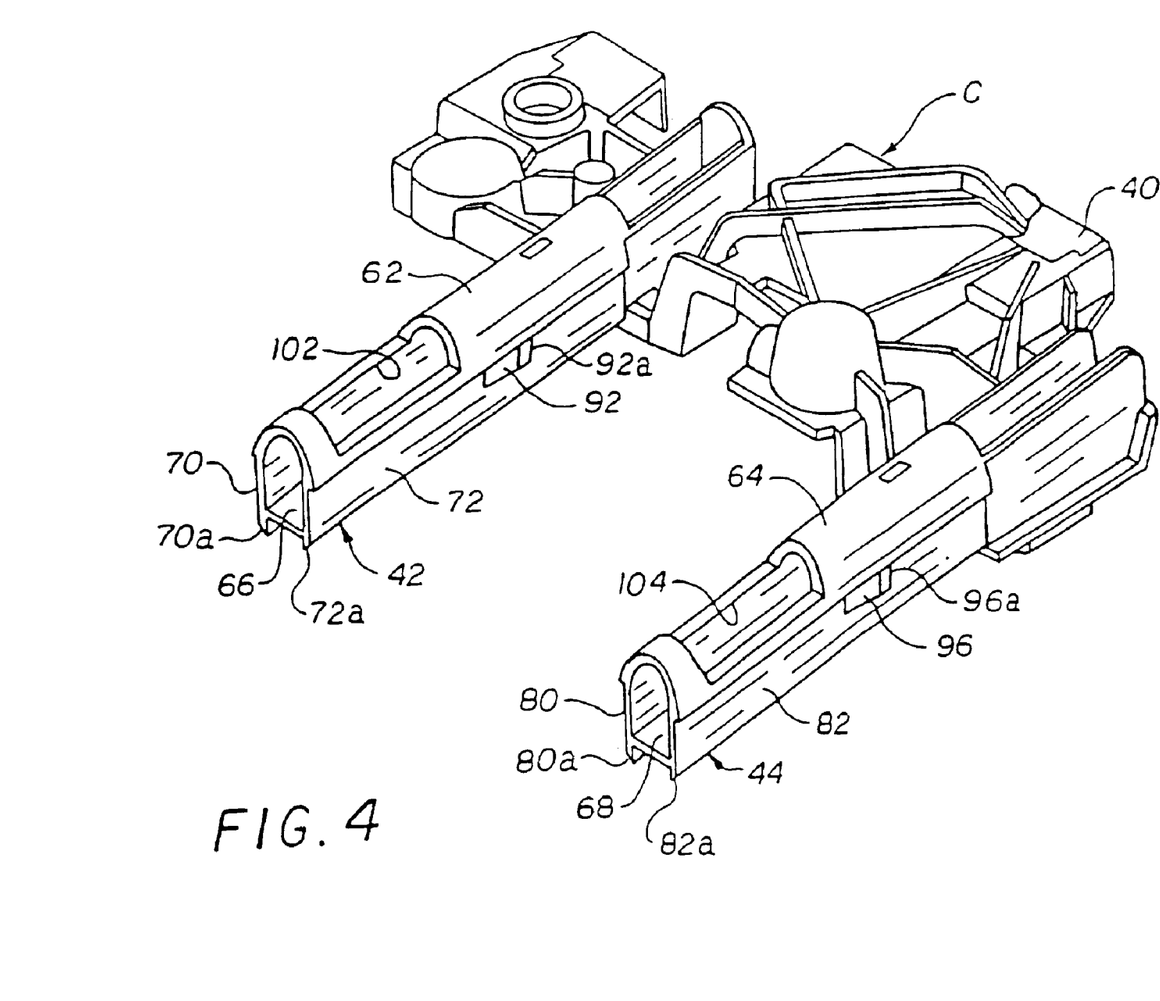
FIG. 4 is a front perspective illustration thereof.

With reference to FIGS. 3 and 4, tubular mounting arms 42, 44 have outwardly curved front portions 62, 64 and flat rear web portions 66, 68. Parallel flat sidewalls 70, 72 on mounting arm 42 extend between curved front portion 62 and rear web portion 66. Flat sidewalls 70, 72 project rearwardly beyond rear web portion 66 as generally indicated at 70a, 72a. Mounting arm 44 has flat parallel sidewalls 80, 82 extending between front outwardly curved portion 64 and flat rear web portion 68. Flat sidewalls 80, 82 extend rearwardly beyond flat web portion 68 as indicated at 80a, 82a.

Opposite inclined projections 90, 92 on the outer surfaces of flat sidewalls 70, 72 of mounting arm 42 provide inclined ramps that cam flexible tabs 14a, 14b on tubular support arm 14 outwardly to ride past the projections when mounting arm 42 is telescoped inside of support arm 14 during initial assembly. Tabs 14a, 14b then snap inwardly and cooperate with end stops or abutments 90a, 92a on projections 90, 92 to limit outward movement of mirror head assembly B and prevent separation of mounting arm 42 from support arm 14. Mounting arm 44 has opposite inclined projections 94, 96 with end stops or abutments 94a, 96a that cooperate with tabs 16a, 16b on tubular support arm 16 in the same manner. A tool may be used to release the tabs from engaging the end stops when it is desired to separate the mounting arms from the support arms for repair or replacement purposes.

Each mounting arm 42, 44 has a generally rectangular opening 102, 104 in curved front wall 62, 64 thereof closely adjacent the free end of the arm. A pair of longitudinally-spaced holes 106, 108 are provided in flat rear web portion 66 of mounting arm 42 opposite from opening 102, along with corresponding holes 110, 112 in rear web portion 68 of mounting arm 44 opposite from opening 104. These openings and holes are for use in connection with friction shoe members as will be described with reference to FIG. 5.

Figure 5:
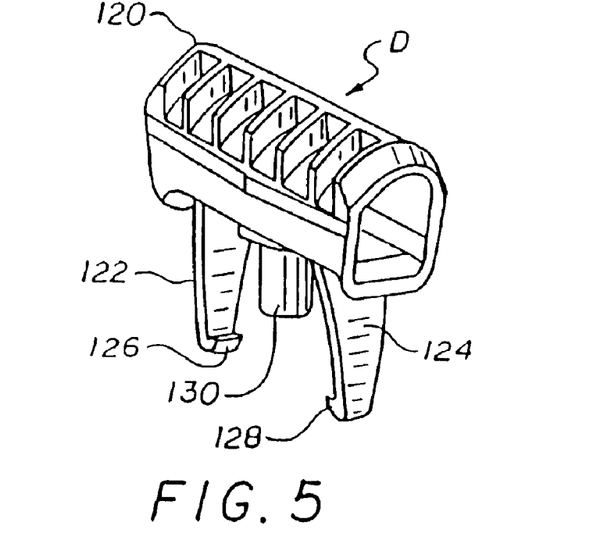
FIG. 5 is a perspective illustration of a friction shoe used with the assembly of FIGS. 1 and 2.
Figure 6:
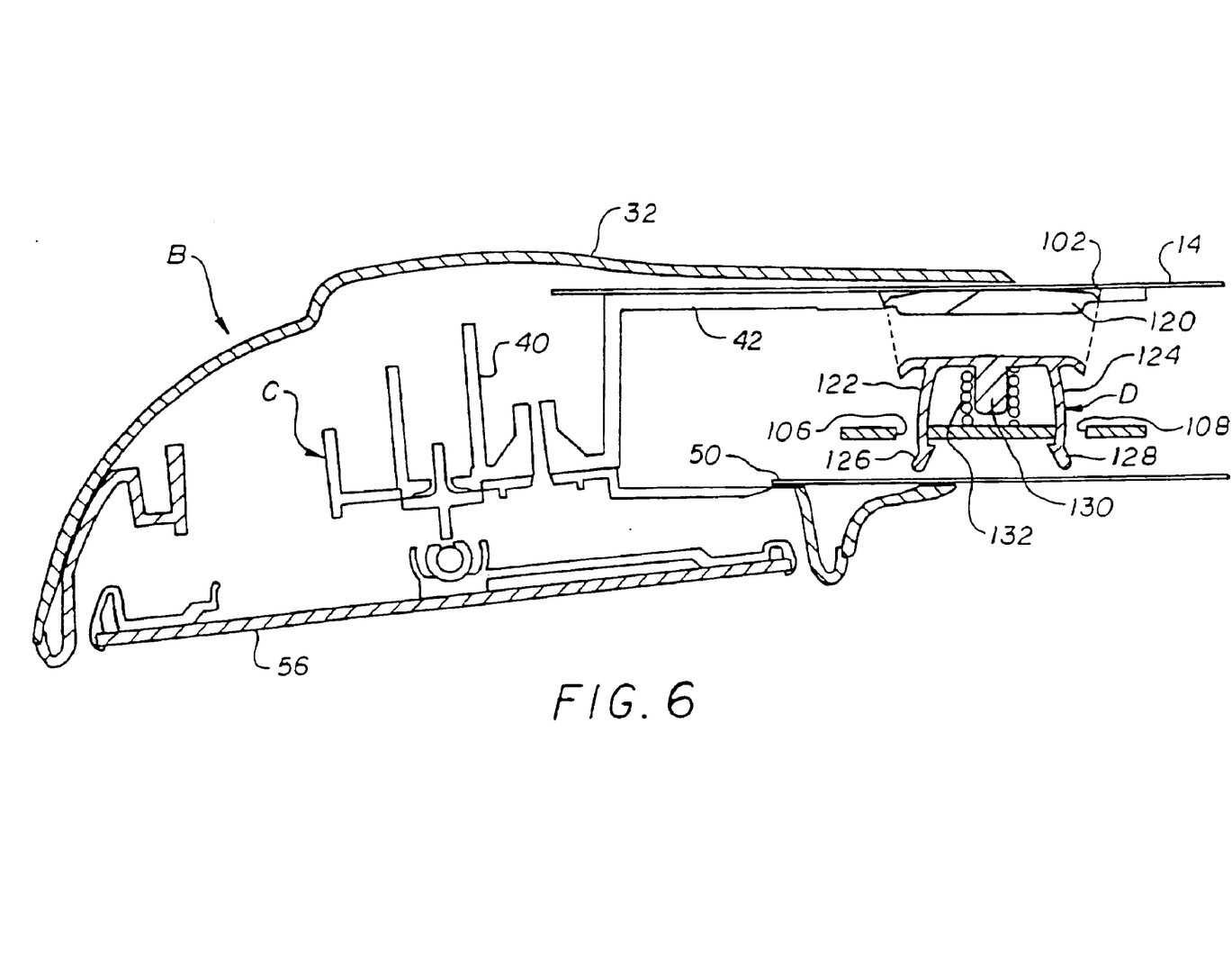
FIG. 6 is a partial cross-sectional plan view showing the friction shoe of FIG. 5 in an installed position.
Figure 7:
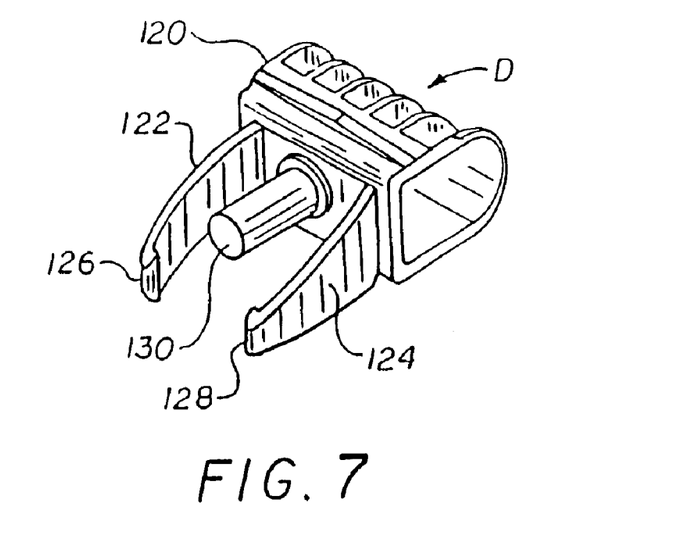
FIG. 7 is a partial perspective illustration showing a stop for the friction shoe to prevent complete displacement of a mounting arm from within a support tube.
Figure 8:
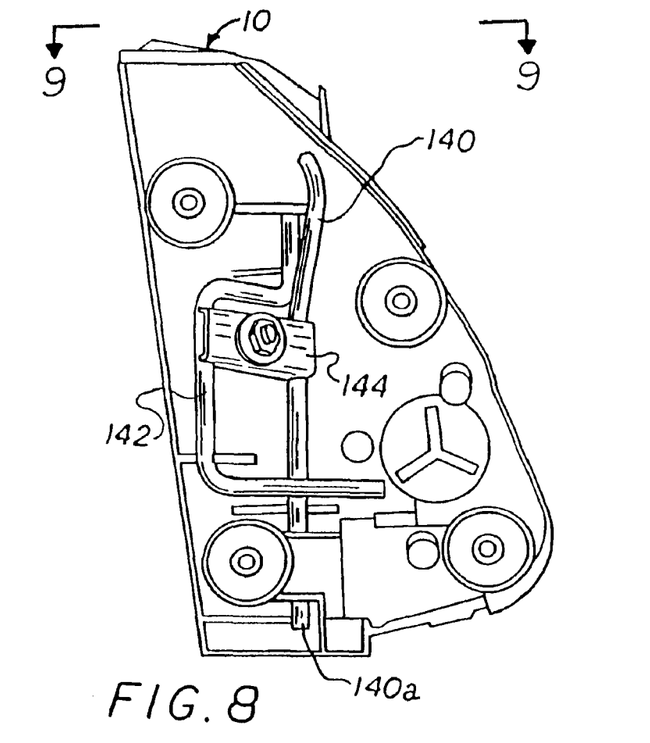
FIG. 8 is a rear elevational view of a support base that is adapted to be attached to a vehicle.

In FIGS. 5–7, friction shoe D includes an enlarged head portion 120 having a curved outer surface that is curved at approximately the same curvature as the interior surfaces of tubular support arms 14, 16. Friction shoe D has a pair of spaced-apart rearwardly projecting arms 122, 124 with barbed end portions 126, 128. A central guide projection 130 extends rearwardly from head 120 between arms 122, 124 for receiving a coil spring 132 as shown in FIG. 2.

A friction shoe D is insertable through opening 102 in mounting arm 42, with arms 122, 124 being inserted first so that barbed end portions 126, 128 snap through holes 106, 108 in rear web 66. This attaches spring 132 and friction shoe D to mounting arm 42 for holding same in position during initial assembly of mounting arm 42 within tubular support arm 14. Friction shoe D is depressed inwardly against the biasing force of spring 132 to allow the shoe to be received within support arm 14 along with mounting arm 42.

The spacing between friction shoe arms 122, 124 and the spacing between holes 106, 108 are such that the arms are spring loaded when they are inserted into the holes so that there will be no relative movement between a friction shoe and a mounting arm in a direction parallel to the longitudinal axis or length of the mounting arm.

After assembly of the mounting arms within the tubular support arms, engagement of the friction shoe with the inner surface of tubular support arm 14 compresses spring 132 so that barbs 126, 128 project freely beyond web 66 into the space between extensions 70a, 72a of sidewalls 70, 72. The dimensions of friction shoe arms 122, 124 relative to holes 106, 108 and 110, 112 are such as to permit movement of the arms relative to the holes in a direction that is parallel to the length of the arms. This allows a friction shoe to move relative to its mounting arm in a direction that is perpendicular to the length of the mounting arm so that a spring 132 biases the shoe into engagement with the inner surface of a support tube. A similar friction shoe D is assembled in the same manner to mounting arm 44.

The coil springs bear against rear web portion 66 or 68 to bias the outer curved surface on head 120 of friction shoes D through opening 102 or 104 into engagement with the inner surfaces of tubular support arms 14, 16. This permits longitudinal sliding adjustment of mounting arms 42, 44 relative to tubular support arms 14, 16 while releasably holding the mounting arms in a desired adjusted position against longitudinal movement relative to support arms 14, 16.

Figure 9:
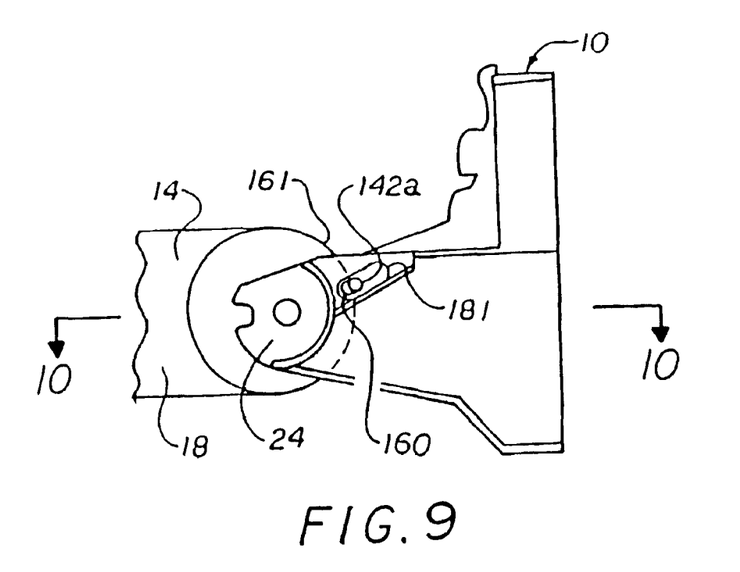
FIG. 9 is a side elevational view taken generally on line 9—9 of FIG. 8.
Figure 10:
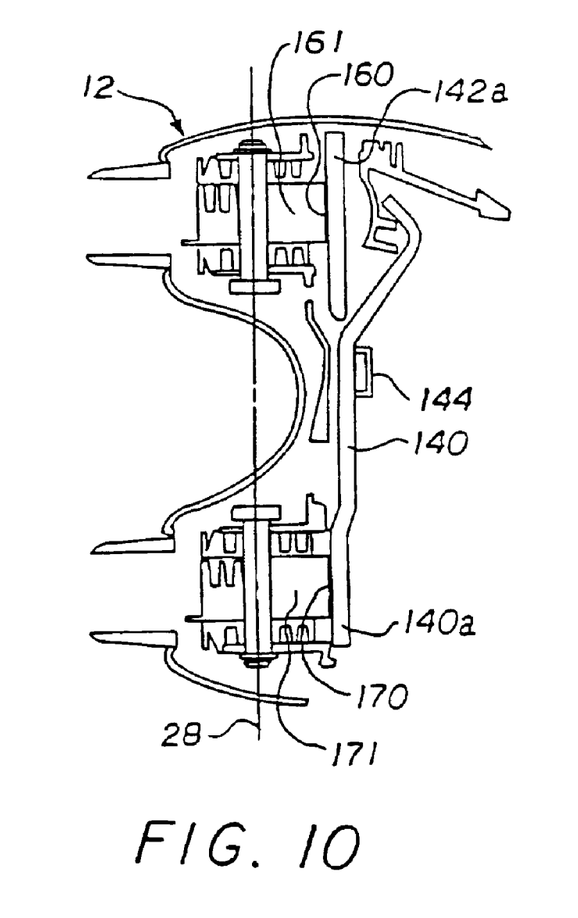
FIG. 10 is a partial cross-sectional elevational view taken on line 10—10 of FIG. 9 with portions omitted for clarity of illustration and showing detent members on tubular support arms cooperating with spring rods.
Figure 11:
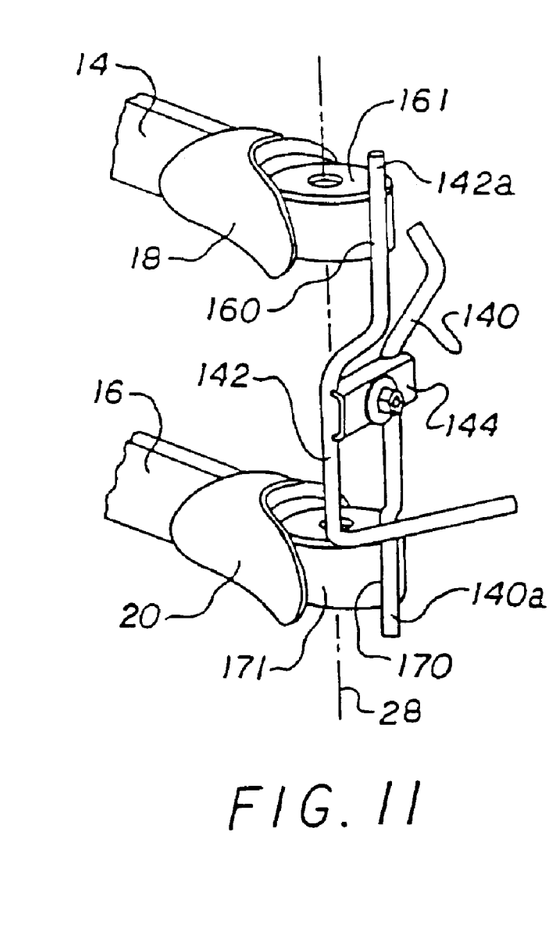
FIG. 11 is a partial perspective illustration showing the detent members and torsion rods of FIGS. 8–10.

With reference to FIGS. 8–11, a pair of spring elements or rods 140, 142 are attached to the rear of support base 10 by a clamp 144. Spring rod 142 has an upper end portion 142a that extends through a hole 181 in support base 10 and cooperates with an axially extending detent 160 in the outer periphery of a detent member 161 on mounting portion 18 of support arm 14. This normally holds support arm 14 in the position shown in FIG. 1 extending straight out from support A. When forward or rearward horizontal force is applied to mirror assembly B, detent 160 resiliently cams upper end portion 142a of spring rod 142 outwardly onto the outer circumferential surface of detent member 161 to permit rotation of support arm 14 about vertical axis 28 relative to support base 10. Hole 181 is oblong as shown in FIG. 9 in a direction away from the outer periphery of detent member 161 to permit movement of spring rod end portion 142a away from detent member 161 when end portion 142a moves out of detent 160 and onto the outer periphery of detent member 161. Spring rod 140 has a lower end portion 140a that cooperates with a detent 170 in a detent member 171 on mounting portion 20 of support arm 16 in the same manner. More specific descriptions and illustrations of the detents and their manner of operation may be found in U.S. Pat. No. 5,841,594 issued Nov. 24, 1998, to Rothe. The Rothe patent is assigned to the same assignee as the present application and the disclosure of the patent hereby is incorporated herein by reference.

Figure 12:
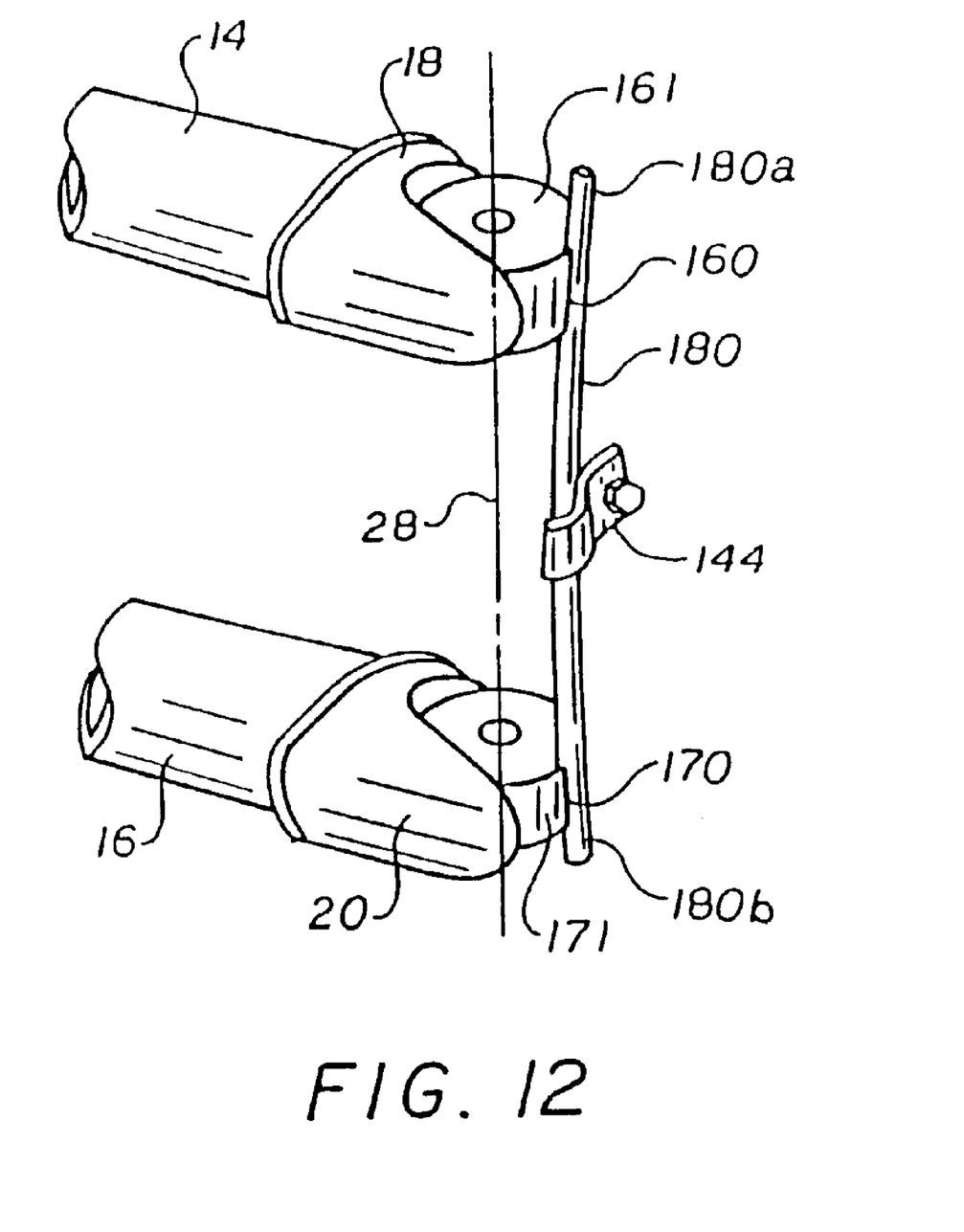
FIG. 12 is a partial perspective illustration showing detents on support arms cooperating with a single spring rod.

In the arrangement of FIG. 12, a single spring rod 180 has opposite end portions 180a, 180b cooperating with detents 160, 170 to releasably hold support arms 14, 16 against rotation. When a sufficiently large force is applied to arms 14, 16, spring rod end portions 180a, 180b yield as they are cammed out of detents 160, 170 to ride on the periphery of detent members 161, 171. This permits rotation of the support arms about a vertical axis 28 for movement of the mirror assembly toward the vehicle.

In the arrangement of the present application, it will be recognized that friction shoe D defines a releasable holding device that is located completely internally of the tubular support arms for releasably holding the telescoping mounting arms against unintentional longitudinal movement relative to the tubular support arms. Grasping of the mirror head assembly in a person's hands and applying force toward or away from the support base overcomes the frictional resistance of the friction shoes to enable variation in the distance between the mirror head and the support base. Mounting arms 42, 44 are generally tubular as illustrated in the drawings. The spring rods also may be referred to as torsion rods, or as resilient or yieldable elements.

Figure 13:
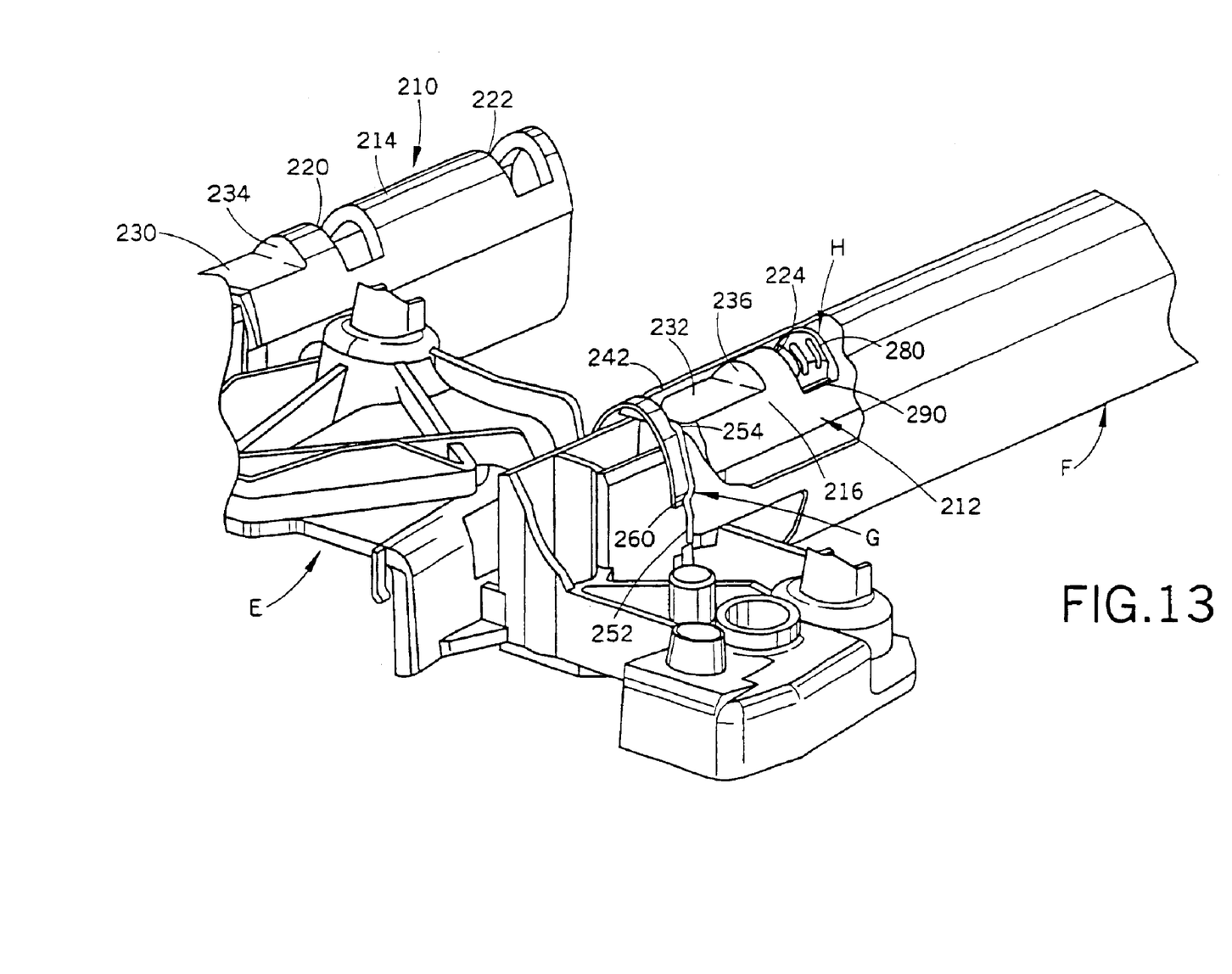
FIG. 13 is a partial perspective illustration of a preferred embodiment for the mounting arms, support tubes and friction shoes.

FIG. 13 shows a preferred embodiment that includes a base plate E having a pair of integral spaced-apart parallel mounting arms 210 and 212 extending outwardly therefrom. Each mounting arm 210, 212 has a cross-sectional shape that is similar to that of mounting arms 42, 44 in FIG. 4. Thus, each mounting arm 210, 212 has an arcuate outer surface 214, 216 that is transversely curved to generally correspond with the inner transverse curvature of a support tube that receives a mounting arm. Mounting arm 210 has a pair of longitudinally-spaced openings 220, 222 in arcuate outer surface 214 thereof. Mounting arm 212 has a corresponding pair of openings, only one of which is shown at 224 in FIG. 13 and the other of which is shown at 226 in FIG. 16. Arcuate surfaces 214, 216 are cut-away adjacent to base plate E as indicated at 230, 232 to provide generally vertical abutment surfaces 234, 236. The cross-sectional size and shape of the mounting arms is such that they are closely received in the tubular support arms while being longitudinally movable relative thereto.

Figure 14:
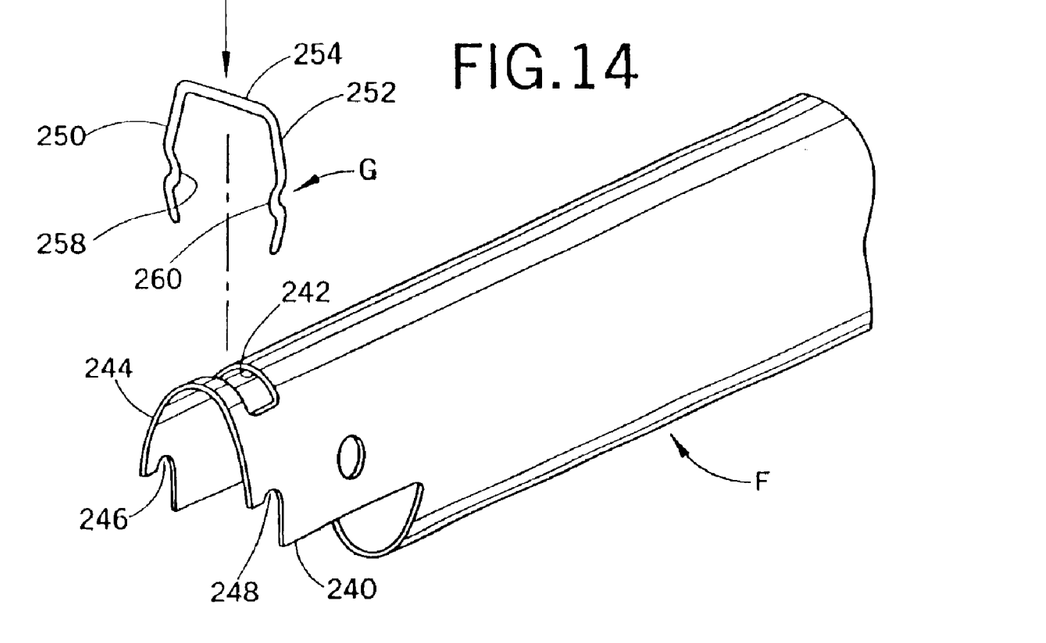
FIG. 14 is a perspective illustration of a support tube and a spring clip that attaches to the tube to provide a stop.

Each of mounting arms 210 and 212 is received in a support tube, only one of which is shown at F in FIGS. 13 and 14. The lower end portion of support tube F is cut-away as indicated at 240 to allow the upper portion of the support arm to extend over baseplate E. A transverse opening 242 is provided in support arm F spaced inwardly from inner end 244 thereof for receiving a stop portion of a clip as described hereafter. A pair of opposite notches 246, 248 are provided in alignment with opening 242 for attaching the stop clip to the tubular support arm.

A generally U-shaped spring clip G has a pair of spaced-apart legs 250, 252 connected by a base portion 254 that defines a stop for preventing removal of a mounting arm from within a tubular support arm. Legs 250, 252 are bent to provide inwardly extending detents 258, 260 located intermediate the ends of legs 250, 252 and the base portion 254.

Subsequent to insertion of a mounting arm into a support arm, as shown by way of example for mounting arm 212 and support arm F in FIG. 13, spring clip G is positioned with legs 250, 252 thereof straddling support tube F and is then pushed downwardly until detents 258, 260 snap into notches 246, 148. In this position, base portion 254 extends across opening 242 and rests against the opposite bottom side edges thereof as shown in FIG. 13 to provide a stop that is engageable by abutment surface 236 to prevent complete displacement of mounting arm 212 from within support arm F. A corresponding clip and end stop arrangement is provided for mounting arm 210 and its support tube.

Figure 15:
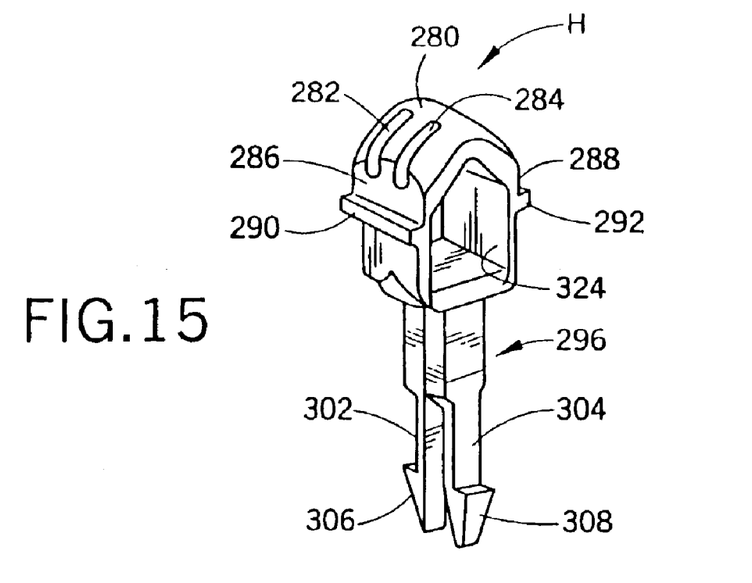
FIG. 15 is a perspective illustration of a friction shoe used in the preferred embodiment of FIG. 13.

FIG. 15 shows a friction shoe H having an arcuate outer friction surface 280 that is not curved at a constant radius because the friction shoe does not run on the centerline of the support tube, and the friction shoe must be symmetrical for use on both left and right mirror assemblies. Transverse grooves 282, 284 are provided in friction surface 280 adjacent flat side 286 thereof for transporting dirt or foreign material away from the interface between the friction surface of a friction shoe and the inner surface of a tubular support arm. The grooves also reduce the contact area of a shoe friction surface to provide a higher unit force of engagement between a friction surface and the inner surface of a tubular support arm. The grooves also reduce the amount of plastic material used to mold the friction shoes. Corresponding groves are provided in friction surface 280 adjacent the opposite flat surface 288.

Figure 18:
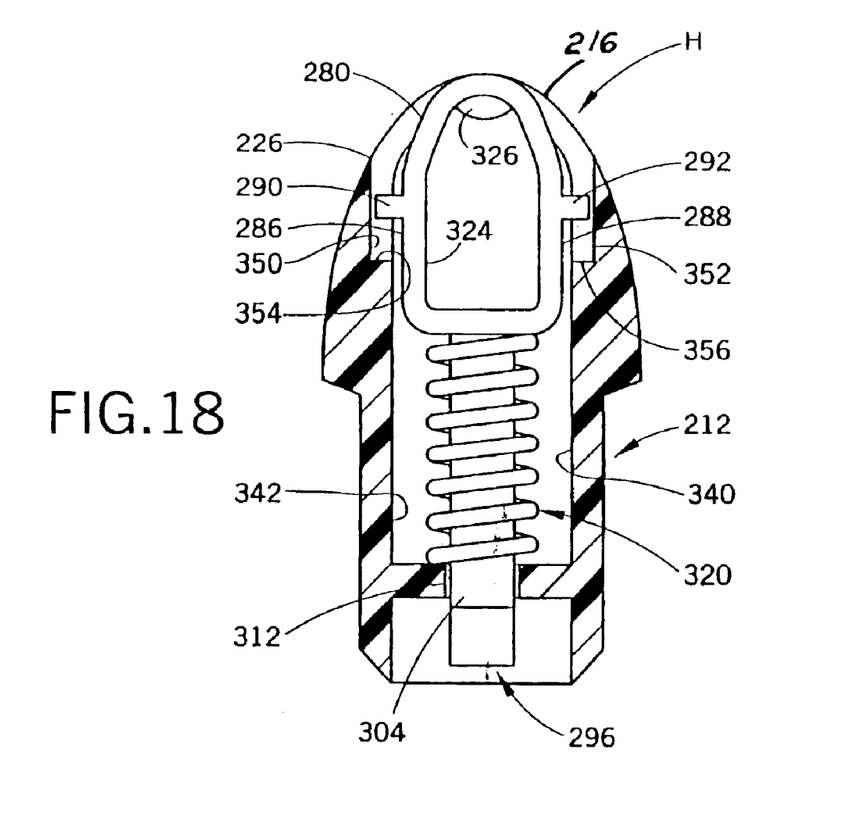
FIG. 18 is a cross-sectional elevational view taken generally on line 18—18 of FIG. 17, and with a friction shoe of FIG. 15 added to show how a shoe is received in a mounting arm.

The curvature of an outer friction surface 280 relative to the curved outer surface 216 of a mounting arm 212 is illustrated in FIG. 18. Because the curvature of mounting arm outer surface 216 is approximately the same as the curvature of the inner surface of a tubular support arm F, this also illustrates the approximate curvature of friction surface 280 relative to the curvature of the inner surface of a tubular support arm. Thus, it is only the outer apex portion of a friction surface 280 that engages the inner surface of a tubular support arm. A friction shoe usually is inclined to the vertical up to about 3° when it is within a tubular support arm. The inclination will be either to the right or to the left depending on whether it is the right or left mirror assembly.

Figure 16:
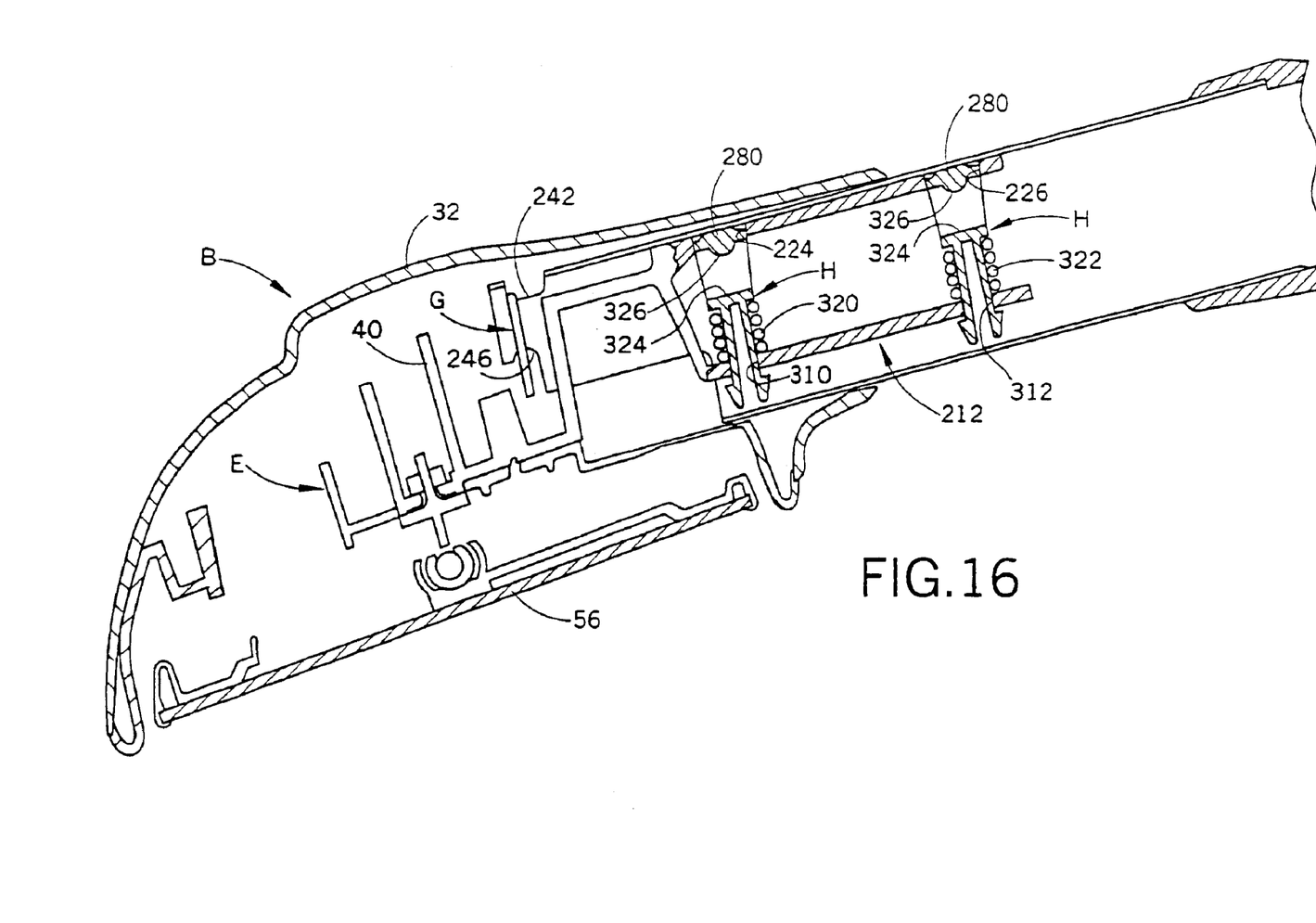
FIG. 16 is a cross-sectional view similar to FIG. 6 but showing the preferred embodiment of FIG. 13.

Longitudinal ribs 290, 292 project outwardly from opposite side flat surfaces 286, 288 as shown in FIG. 15. A guide stem 296 includes a pair of spaced-apart arms 302, 304 having barbed end portions 306, 308 that snap through openings 310, 312 in mounting arm 212 as shown in FIG. 16. Prior to snapping the barbed arms 302, 304 through openings 310, 312, coil springs 320, 322 are positioned over the arms. The length of the springs relative to the arms is such that friction shoes H are outwardly biased so that friction shoes 280 engage the inner surface of a tubular support arm.

The enlarged head of friction shoe H has an opening 324 therethrough. When a friction shoe is positioned within a mounting arm, opening 324 extends in the direction of the longitudinal axis of the mounting arm. A rounded projection 326 that is shown in FIGS. 16 and 18 projects into the top of opening 324 on the opposite side of friction surface 280. Electrical wires may extend through the mounting and support arms, and through openings 324 in friction shoes H for supplying power to a motorized adjustment or a defrosting device in the mirror head. Rounded projections 326 in the friction shoe openings help to prevent abrasion or pinching of the wires in the gap between mounting arm openings 224, 226 and the heads of friction shoes H.

Figure 17:
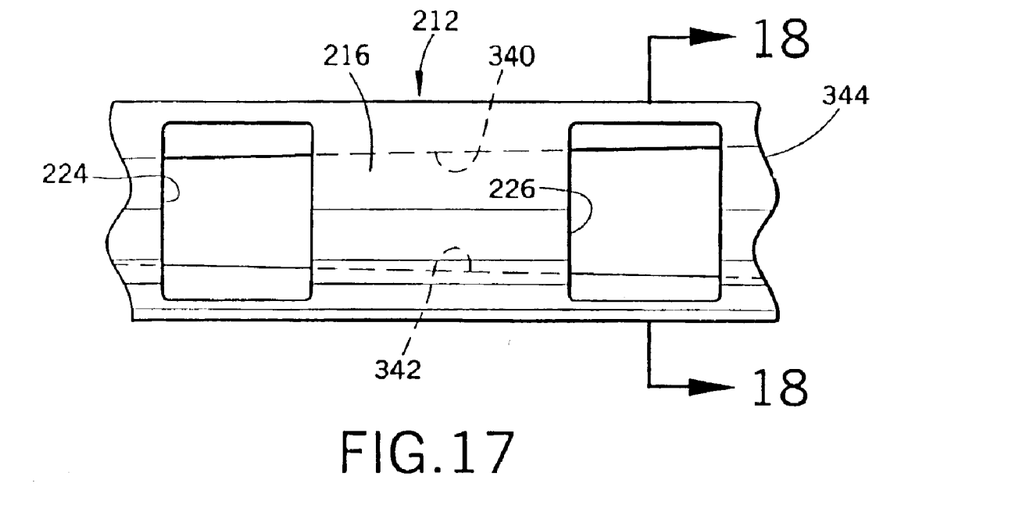
FIG. 17 is a top plan view of one of the mounting arms that extends outwardly from the base of FIG. 13.

FIG. 17 shows mounting arm 212 as having internal sidewall surfaces 340, 342 that converge in a direction inwardly of the mounting arm from open terminal end 344 thereof. This slope on the internal sidewall surfaces enables a core pull from open end 344 when the base plate and its integral mounting arms are molded of plastic material. In view of this convergence of the interior sidewall surfaces, the body or enlarged head of friction shoe H is reduced in width across flat sides 286, 288 thereof. The reduced width of the enlarged head allows the head to be received within areas of reduced width between sidewall inner surfaces 340, 342.

As shown in FIG. 18, opening 226 in mounting arm 212 is made with opening sidewalls 350, 352 that are spaced-apart a greater distance than inner sidewall surfaces 340, 342 of mounting arm 212. The spacing of opening sidewalls 350, 352 is the same for both of openings 226 and 224. Opening sidewalls 350, 352 intersect inwardly extending horizontal shoulders 354, 356 that in turn intersect inner sidewall surfaces 342, 340. Longitudinal guide ribs 290, 292 on friction shoe H are relatively closely received between opening sidewalls 350, 352 for guiding movement thereof and providing lateral stability for the friction shoe.

The depth of opening sidewalls 350, 352 is such as to enable depression of a friction shoe H downwardly for snapping the barbed ends of guide stem arms 302, 304 through a mounting arm opening 312. Coil spring 320 then acts against the bottom wall of mounting arm 212 and the underside of the enlarged head on friction shoe H for biasing friction shoe H upwardly in FIG. 18. When a mounting arm is received within a support arm, spring 320 is compressed and the barbed ends of guide stem arms 302, 304 are spaced slightly from the outer bottom surface of mounting arm 212.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A vehicle exterior rear view mirror assembly comprising:

a support base mountable externally on a vehicle;

a pair of vertically-spaced parallel hollow support tubes extending outwardly from said support base;

a mirror head having a mirror head housing;

a mirror mounted on said mirror head housing;

a pair of vertically-spaced tube receiving openings in said mirror head housing rearwardly of said mirror and facing toward said support base;

said support tubes being slidably received in said openings for providing movement of said mirror head toward and away from said support base;

said support tubes having open ends within said mirror head housing;

a pair of mounting arms on said mirror head;

said mounting arms extending into said support tubes through said open ends thereof;

said mounting arms and said support tubes being longitudinally movable relative to one another for providing movement of said mirror head toward and away from said support base; and said base plate and said pair of mounting arms being molded in one-piece of plastic material.

2. A vehicle exterior rear view mirror assembly comprising:

a support base mountable externally on a vehicle;

a pair of vertically-spaced parallel hollow support tubes extending outwardly from said support base;

a mirror head having a mirror head housing;

a mirror mounted on said mirror head housing;

a pair of vertically-spaced tube receiving openings in said mirror head housing rearwardly of said mirror and facing toward said support base;

said support tubes being slidably received in said openings for providing movement of said mirror head toward and away from said support base;

said support tubes having open ends within said mirror head housing;

friction devices carried by said mirror head and extending into said support tubes through said open ends thereof for releasably holding said mirror head against movement toward and away from said support base; and said support tubes having internal surfaces and said friction devices being friction shoes yieldably biased into engagement with said internal surfaces.

* * * * *